(12) United States Patent
Ryu

(10) Patent No.: US 8,610,558 B2
(45) Date of Patent: Dec. 17, 2013

(54) METHOD FOR DETECTING MULTIPLE EVENTS AND SENSOR NETWORK USING THE SAME

(75) Inventor: Je-Hyok Ryu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 858 days.

(21) Appl. No.: 12/730,477

(22) Filed: Mar. 24, 2010

(65) Prior Publication Data
US 2010/0248639 A1 Sep. 30, 2010

(30) Foreign Application Priority Data

Mar. 24, 2009 (KR) .................. 10-2009-0025152
Dec. 4, 2009 (KR) .................. 10-2009-0120022

(51) Int. Cl.
*G08B 23/00* (2006.01)
*G08B 19/00* (2006.01)
*H04B 17/00* (2006.01)

(52) U.S. Cl.
USPC .......... 340/523; 340/517; 340/521; 340/522; 455/67.11

(58) Field of Classification Search
USPC .................. 455/67.11, 509; 340/522, 523
See application file for complete search history.

(56) References Cited

U.S. PATENT DOCUMENTS

| 2004/0028023 | A1 | 2/2004 | Mandhyan et al. |
| 2004/0215092 | A1* | 10/2004 | Fischell et al. ............... 600/515 |
| 2006/0215025 | A1* | 9/2006 | Le Maigat et al. ........... 348/143 |
| 2011/0060496 | A1* | 3/2011 | Nielsen et al. ................ 701/33 |

FOREIGN PATENT DOCUMENTS

| KR | 1020040097368 | 11/2004 |
| KR | 100699510 | 3/2007 |
| KR | 1020090006936 | 1/2009 |

OTHER PUBLICATIONS

Shuoqi Li et al., "Event Detection Services Using Data Service Middleware in Distributed Sensor Networks", Department of Computer Science, University of Virginia, Jun. 2004.

* cited by examiner

*Primary Examiner* — Temesgh Ghebretinsae
*Assistant Examiner* — Devan Sandiford
(74) *Attorney, Agent, or Firm* — The Farrell Law Firm, P.C.

(57) ABSTRACT

A method and network for detecting multiple events is provided. The method includes detecting at least one subordinate event constituting a superordinate event, determining whether another subordinate event constituting the superordinate event exists in a time window other than a current time window in which the detected subordinate event is included, and determining that the superordinate event has occurred and reporting the determination, if the subordinate events constituting the superordinate event exist within a duration of the superordinate event.

13 Claims, 6 Drawing Sheets

```
Require:
    REPORTS of t(e_{i_s}) and t(e_{i_f})
Ensure:
// FIND AND STORE START TIME
 1: if REPORT t(e_{i_s}) then
 2:     if PTH[0,j] AND (!PTH[1,j] OR PTH[1,j] == t(e_{i_s})) then
 3:         Conjunctionable[j,i].st ← t(e_{i_s});
 4:         Disjunctionable[j,i].st ← PTH[0,j];
 5:     else
 6:         Disjunctionable[i,j].st ← t(e_{i_s});
 7:     end if
 8:     PTH[0,i] ← t(e_{i_s});
 9: end if
// FIND AND STORE FINISH TIME
10: if REPORT t(e_{i_f}) then
11:     if PTH[1,j] AND PTH[0,i] ≤ PTH[1,j] then
12:         if PTH[0,j] ≤ PTH[0,i] then
13:             Conjunctionable[j,i].ft ← PTH[1,j];
14:             Disjunctionable[j,i].ft ← t(e_{i_f});
15:         else
16:             Conjunctionable[i,j].st ← PTH[0,j];
17:             Conjunctionable[i,j].ft ← PTH[1,j];
18:             Disjunctionable[i,j].ft ← t(e_{i_f});
19:         end if
20:     else
21:         if PTH[0,j] then
22:             if PTH[0,j] ≤ PTH[0,i] then
23:                 Conjunctionable[j,i].ft ← t(e_{i_f});
24:             else
25:                 if PTH[0,j] ≤ t(e_{i_f}) then
26:                     Conjunctionable[i,j].ft ← t(e_{i_f});
27:                 else
28:                     Disjunctionable[i,j].ft ← t(e_{i_f});
29:                     Disjunctionable[j,i].st ← PTH[0,j];
30:                     if 2tw < PTH[0,j] - t(e_{i_f}) then
31:                         lintialize PTH[a,i] and PTH[a,j] by 0 where 'a' is 0 and 1
32:                     end if
33:                 end if
34:             end if
35:         else
36:             PTH[1,i] ← t(e_{i_f});
37:         end if
38:     end if
39: end if
```

FIG.5

METHOD FOR DETECTING MULTIPLE EVENTS AND SENSOR NETWORK USING THE SAME

PRIORITY

This application claims priority under 35 U.S.C. §119(a) to a Korean Patent Application filed in the Korean Intellectual Property Office on Mar. 24, 2009 and assigned Serial No. 10-2009-0025152, and a Korean Patent Application filed in the Korean Intellectual Property Office on Dec. 4, 2009 and assigned Serial No. 10-2009-0120022, the entire disclosure of both of which is hereby incorporated by reference.

BACKGROUND OF THE INVENTION

1. Field of the Invention

The present invention relates generally to detecting events in a wireless sensor network, and more particularly, to detecting a complex event from various types of data obtained by multiple sensors.

2. Description of the Related Art

In wireless sensor networks, event detection plays key roles in most surveillance and monitoring application fields such as national surveillance, environmental monitoring and medical diagnostics. The above-mentioned events relate to data detected in different sensors, and a complex event may be defined as means for detecting real situations that are more complex than actually occurring events by integrating many different events described above.

Complex event detection requires multiple message communications since many different events are linked to each other in a complex way. Therefore, complex event detection has been developing to minimize message communication between sensors constituting the wireless sensor network and to detect the higher-order abstract real world.

For example, in order to detect real complex situations such as an explosion which cannot be detected by a single hardware sensor, a complex event may require various events detected in respective sensors, such as sudden changes in temperature, sudden changes in light, and sudden changes in noise levels. If there is an available sensor capable of directly detecting the explosion, it is possible to detect the explosion event by means of direct sensing without detecting the explosion by composing a complex event. However, when it is not possible to detect a certain event like an explosion simply by means of direct sensing, complex event detection is indispensable. Also, if there is a single sensor for detecting explosions, it is possible to handle much higher complex real-world events using the sensor.

Time window-based complex event detection in sensor networks is disclosed in "Event Detection Services Using Data Service Middleware in Distributed Sensor Networks", by S. Li, S. Son, and J. Stankovic, Telecommunication Systems, Special Issue on Information Processing in Sensor Networks, vol. 26, no. 2-4, pp 351-368, August 2004.

The group-based real-time event detection services in sensor networks, proposed by S. Li et al., are applied to detect whether events constituting a complex event based on a reliability function have occurred within a time window set by developers. Complex events requiring an order of event occurrences have not been considered. The complex event of an explosion given as an example may be defined as a combination of individual events such as temperature, light and sound, and a reliability function has been defined that can give weights to the respective events and calculate their sum. When the sum exceeds a specific value determined by the application developers, a complex event such as an explosion is detected and reported.

Event detection is performed within a time window set by a given system or a client. With respect to the time window, if there is a difference in time for which different events last, event detection within the time window may fail to detect the required events or to rely on the reliability function set by the application developers.

SUMMARY OF THE INVENTION

An aspect of the present invention is to address at least the above-mentioned problems and/or disadvantages and to provide at least the advantages described below. Accordingly, an aspect of the present invention is to resolve a problem of failing to detect multiple events due to the events that are not included in a time window.

Another aspect of the present invention provides an event detection method and a sensor network for comparing events included in duration of an event regardless of a time window, thereby making it possible to detect a more accurate complex event or multiple complex events and to minimize communication between sensor nodes for detecting events.

In accordance with one aspect of the present invention, there is provided a sensor network. The sensor network includes sensor nodes including multiple sensors for detecting primitive events, and a coordinator node for determining whether the primitive events detected in the sensors are included in a duration of complex event, and determining that the complex event has occurred if the primitive events are included in the duration.

In accordance with another aspect of the present invention, there is provided a method for detecting multiple events. The method includes detecting at least one subordinate event constituting a superordinate event, determining whether another subordinate event constituting the superordinate event exists in a time window other than a current time window in which the detected subordinate event is included, and determining that the superordinate event has occurred and reporting the determination, if the subordinate events constituting the superordinate event exist within a duration of the superordinate event.

In accordance with a further aspect of the present invention, there is provided a method for detecting multiple events. The method includes reporting a first primitive event detected in a sensor node in a bottom layer, determining whether there exists a subordinate event other than the first primitive event constituting a superordinate event, and determining a relation between the first primitive event and the subordinate event, if the subordinate event exists.

BRIEF DESCRIPTION OF THE DRAWINGS

The above and other aspects, features and advantages of certain embodiments of the present invention will be more apparent from the following description taken in conjunction with the accompanying drawings, in which:

FIG. 5 is a diagram illustrating an algorithm for detecting complex events in advance based on event duration, Conjunctionable and Disjunctionable according to an embodiment of the present invention.

Throughout the drawings, the same drawing reference numerals will be understood to refer to the same elements, features and structures.

DETAILED DESCRIPTION OF THE INVENTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Figure 1:
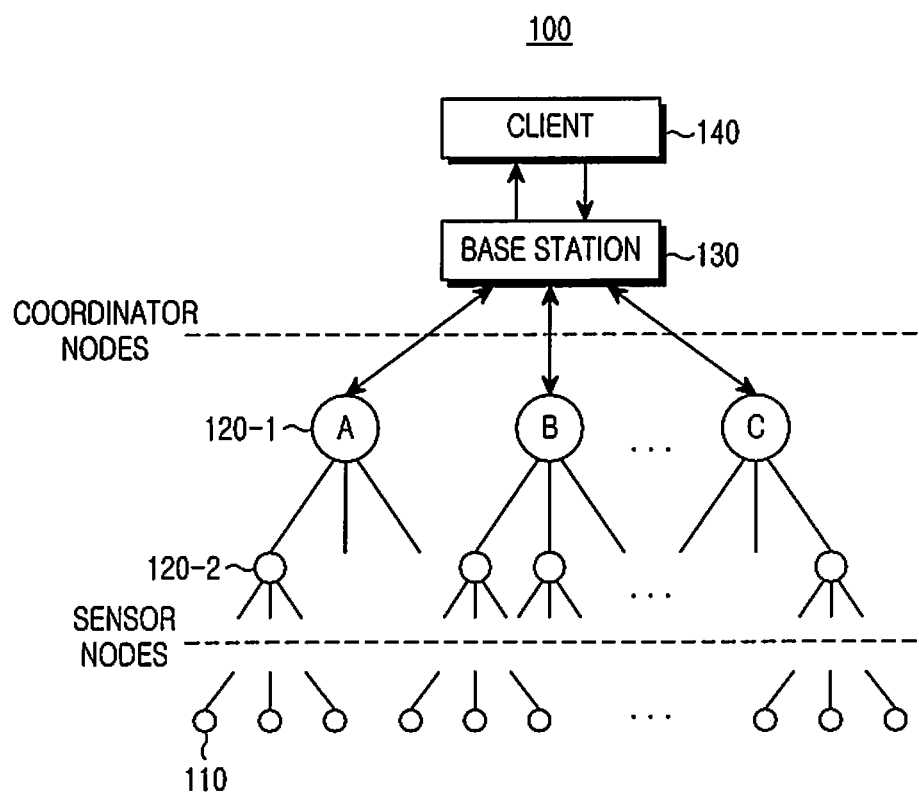
FIG. 1 is a diagram illustrating a hierarchical structure of a sensor network according to a first embodiment of the present invention.

FIG. 1 is a diagram illustrating the configuration of a sensor network for event detection according to an embodiment of the present invention. Referring to FIG. 1, a sensor network 100 according to an embodiment of the present invention includes sensor nodes 110 in the bottom layer, coordinator nodes 120-1, 120-2 in the upper layer of the sensor nodes 110, and a base station 130 for reporting the events reported from the coordinator nodes 120-1, 120-2 to a client (i.e., a client device or a user device) 140.

The sensor nodes 110 each include sensors for surveilling a variety of situations in real time, and report primitive events detected in the sensors to the coordinator nodes 120-1, 120-2 in their upper layer. The coordinator nodes 120-1, 120-2 compound the reported primitive events, determine whether atomic complex events or multiple complex events have occurred, and report the determination to the client 140 by way of the base station 130.

The coordinator nodes 120-1, 120-2 may be divided into lower-layer coordinator nodes 120-2 for receiving primitive events provided from the sensor nodes 110, and upper-layer coordinator nodes 120-1 for determining the occurrence/non-occurrence of multiple complex events including at least one complex event, at least one primitive event, or a combination thereof reported from the lower-layer coordinator nodes 120-2 and reporting the determination to the client 140. The upper-layer coordinator nodes 120-1 may include a memory for storing complex events reported through its transceiver, the transceiver for receiving signals reported from the lower-layer coordinator nodes 120-2 and providing the signals to the memory, and an output device for providing the complex events stored in the memory to the base station 130.

Figure 2A:
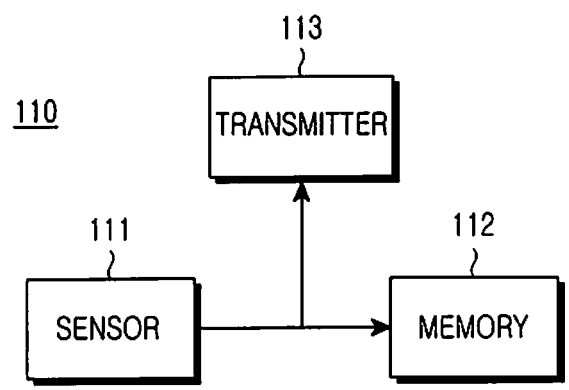
FIGS. 2A and 2B are block diagrams illustrating functional structures of each sensor node and each coordinator node shown in FIG. 1.

FIG. 2A is a block diagram illustrating the structure of the sensor node 110 shown in FIG. 1. Referring to FIG. 2A, the sensor node 110 may include a memory 112 for storing primitive events detected in each sensor 111, and a transmitter 113 for reporting the primitive events stored in the memory 112 to the coordinator nodes 120-1, 120-2 in its upper layer. The lower-layer sensor node detecting primitive events may be extended by adding nodes in its lower layer, so the sensor node 110 and the coordinator node 120-1, 120-2 are merely provided to show functional separation. In terms of hardware, however, the sensor node 110 and the coordinator node 120-1, 120-2 may be the same node including all of their functional blocks.

Figure 2B:
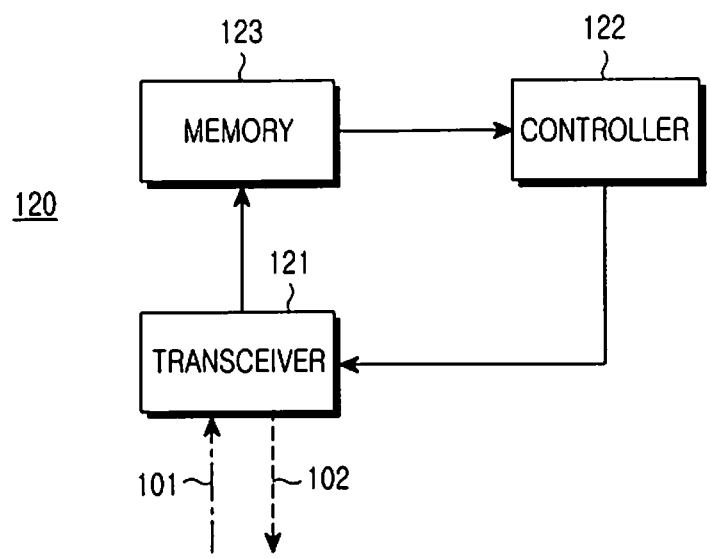

FIG. 2B is a block diagram illustrating the structure of the coordinator node 120-1, 120-2 shown in FIG. 1. Referring to FIG. 2B, the coordinator node 120-1, 120-2 includes a memory 123 for storing primitive events newly reported from each sensor node 110, a controller 122 for determining whether other previous primitive events constituting the complex event in addition to the newly reported primitive events are stored in the memory 123 and generating a report signal for reporting the detection if the complex event is detected, and a transceiver 121 for receiving a message 101 for reporting the primitive events transmitted from said each sensor node 110 113, providing the message 101 to the memory 123, and reporting a report signal 102 generated in the controller 122 to another coordinator node or the base station 130 in its upper layer.

The present invention relates to a method and system for handling and detecting complex events, and the terms for describing the event detection method according to the present invention may be defined as follows.

The physical change (event) in states or situations in the actual real world will be defined as a primitive event. A primitive event is the most basic event that is sensed according to the type of the sensor. If the number of types of events subjected to detection is denoted by n, a set E of primitive events can defined as Equation (1):

$$E=\{e_1, e_2, \ldots e_n\} \quad (1)$$

where E is a set of primitive events ($e_1$~$e_n$), e denotes respective primitive events, and subscripts 1 ... n indicate sequential sensor numbers for the primitive events (i.e., n primitive events corresponding to n sensors, where n is a positive integer).

An Atomic Complex Event (ACE or X) consists of one E (a set of primitive events defined in Equation (1)) or multiple Es, and if primitive events of a certain event have a conjunction ($\wedge$) relation, the event may be defined as an Atomic Complex Event (ACE).

If the primitive events constituting an atomic complex event have all been detected, it can be determined that the atomic complex event has occurred. Otherwise, it can be determined that the atomic complex event has not yet occurred.

For $n \geq 1$, the atomic complex event ACE can be written as Equation (2):

$$ACE = e_1 \wedge e_2 \wedge \ldots \wedge e_n \quad (2)$$

where ACE denotes an atomic complex event, and $e_1$, $e_2$ and $e_n$ denote respective primitive events and are called member events of the ACE (hereinafter, subordinate events constituting a complex event are referred to as "member events"). Equation (2) shows a conjunction relation between primitive events constituting an atomic complex event ($\{e_1, e_2, \ldots, e_n\} \sqsubseteq E$).

If the occurrence order among primitive events constituting an atomic complex event is important, the atomic complex event can be expressed as Equation (3):

$$\vec{ACE} = e_1 \rightarrow e_2 \rightarrow \ldots \rightarrow e_n \quad (3)$$

If multiple events $X_1$~$X_n$ constitute a superordinate complex event Y and a relation between the events $X_1$~$X_n$ is disjunction ($\vee$), the superordinate complex event Y may be recognized to have decomposable characteristics. If the subordinate events $X_1$~$X_n$ are all the events constituting the complex event Y and a relation between all the subordinate events $X_1 \sim X_n$ is disjunction, then the complex event Y may be defined to be fully decomposable. In contrast, if only some of the subordinate events $X_1 \sim X_n$ constituting the complex event Y have a conjunction relation, then the complex event Y may be defined to be partially decomposable. The complex event Y consisting of multiple atomic complex events $X_1 \sim X_n$ may be defined as a Complex Event (CE) with decomposable properties (i.e. Decomposable Complex Event (DCE)).

For example, if a DCE consists of member events and atomic complex events having a disjunction relation (DCE=$E_0 \vee \ldots \vee E_n \vee [ACE_0 \vee \ldots \vee ACE_m]$) and m=0, the DCE may be defined to be fully decomposable. If m≥1, the DCE may be defined to be partially decomposable.

Multiple Complex Events (MCEs) may be defined as superordinate events that consist of different types of events (primitive events, atomic complex events, and complex events), for various applications in the sensor network.

An example of an MCE can be given as Equation (4):

$$MCE = A\overline{C}E_0 \vee e_0 \vee ACE_0 \ldots \vee A\overline{C}E_l \vee e_m \vee ACE_n \quad (4)$$

where MCE denotes an MCE, $ACE_0$ and $ACE_l$ denote atomic complex events, and $e_0$ and $e_m$ denote primitive events. If l, m and n are integers greater than or equal to 1, Equation (4) above represents one MCE.

The DCE may be classified as a type of MCE, and the MCE may consist of multiple DCEs.

Among CEs for MCE-based event detection, partially decomposable CEs may be used. A disjunction relation between events for constituting a CE makes it possible for the already detected events to replace the yet undetected events when a history of events is used. However, the disjunction relation does not always indicate the possibility of replacing other events in MCEs for multi-purpose applications. The reason why it is not always possible to replace other events by means of the disjunction is because every application may have a specific purpose intended by the client. Events that cannot be replaced by the disjunction relation are defined to have an independent disjunction relation, and events that can be replaced by the disjunction relation are defined to have a normal disjunction relation. Detection of events by the independent disjunction relation may be required in the sensor network at their associated different times. The above-described disjunction properties for MCEs may be defined as independent properties for multi-purpose applications.

If there are overlapping complex events or events among subordinate complex events or events constituting an MCE, they may be replaced by the common overlapping complex events or events. In the following description, replaceable events are underlined.

It is assumed herein that an MCE detection system according to an embodiment of the present invention is applied to two different applications of surveillance and monitoring for event detection.

The detection system for surveillance is assumed to have a complex event $CE_1$ defined as Equation (5):

$$CE_1 = x \vee a \vee b \quad (5)$$

where x, a and b may be defined as events or other complex events constituting the complex event $CE_1$.

The detection system for monitoring may be assumed to have a complex event $CE_2$ defined as Equation (6):

$$CE_2 = b \vee c \vee y \wedge z \quad (6)$$

where b, c, y and z may be defined as subordinate events or other complex events constituting the complex event $CE_2$.

The sensor network may consist of sensors capable of detecting primitive events (E={a,b,c,x,y,z}), and the complex event $CE_1$ for surveillance may be classified as a fully decomposable DCE since the complex event $CE_1$ maintains a disjunction relation between its all primitive events or complex events. The complex event $CE_2$ for monitoring is a partially decomposable DCE since the complex event $CE_2$ includes member events having a conjunction relation.

If there are common primitive events or complex events among different complex events $CE_1$ and $CE_2$, a multiple complex event $MCE_1$ can be written as Equation (7):

$$MCE_1 = x \vee a \vee \underline{b} \vee c \vee y \wedge z \quad (7)$$

If the complex events $CE_1$ and $CE_2$ satisfy normal disjunction properties and decomposable properties, a disjunction relation between the different complex events $CE_1$ and $CE_2$ may compose the multiple complex event $MCE_1$ shown in Equation (7). If the complex events $CE_1$ and $CE_2$ are replaced by the disjunction properties without regarding decomposable properties together with the independent disjunction properties, the complex event $CE_1$ for surveillance may not be included in the multiple complex event $MCE_1$. In the above example, the independent disjunction properties should be considered when they are replaced in terms of the reusability and the consumption of detected events. Regarding the subordinate complex events constituting the multiple complex event shown in Equation (7) and their subordinate primitive events or complex events, the time required for detection should also be considered when order of occurrences is important.

Overlapping of the subordinate events (complex events or primitive events) with the multiple complex event may cause many re-operations and message communications. Therefore, a method of using a history in which complex events or primitive events are stored may be used in order to minimize the re-operations and message communications. The above-described events (complex events or primitive events) occur during their duration, and durations of multiple events occurring at any time intervals according to the duration may be stored in the form of a history.

Regarding the layers of the events defined above, primitive events are the most subordinate events, atomic complex events are definable as the primitive events, Decomposable Complex Events (DCEs) are definable as the atomic complex events, and Multiple Complex Events (MCEs) are definable as the DCEs.

Complex event detection is performed within a time period (time window) set for detecting subordinate events, but there may be a possibility that the actual duration of each member event of the complex event subjected to detection may not all occur in the time window. Therefore, detection of complex events subjected to detection prepares for even the possibility that the duration of complex events subjected to detection has not been included in a detection window, by comparing even subordinate complex events or primitive events included in the previous time window preceding the current time window of the complex events subjected to detection.

The time window is repeated at regular intervals during the event detection, and all events that have occurred during the time window can be stored (e.g. in a memory) to be recorded as a history of the event detection and then used for later event detection. The duration is a time between the start and finish times of the events, and may or may not be fully included in one time window.

The present invention has classified events and defined their layers as described above. That is, complex event detection according to the present invention uses the events detected in the lower layer even for upper-layer event detection, making it possible to share one event even for detection of different events.

Figure 3:
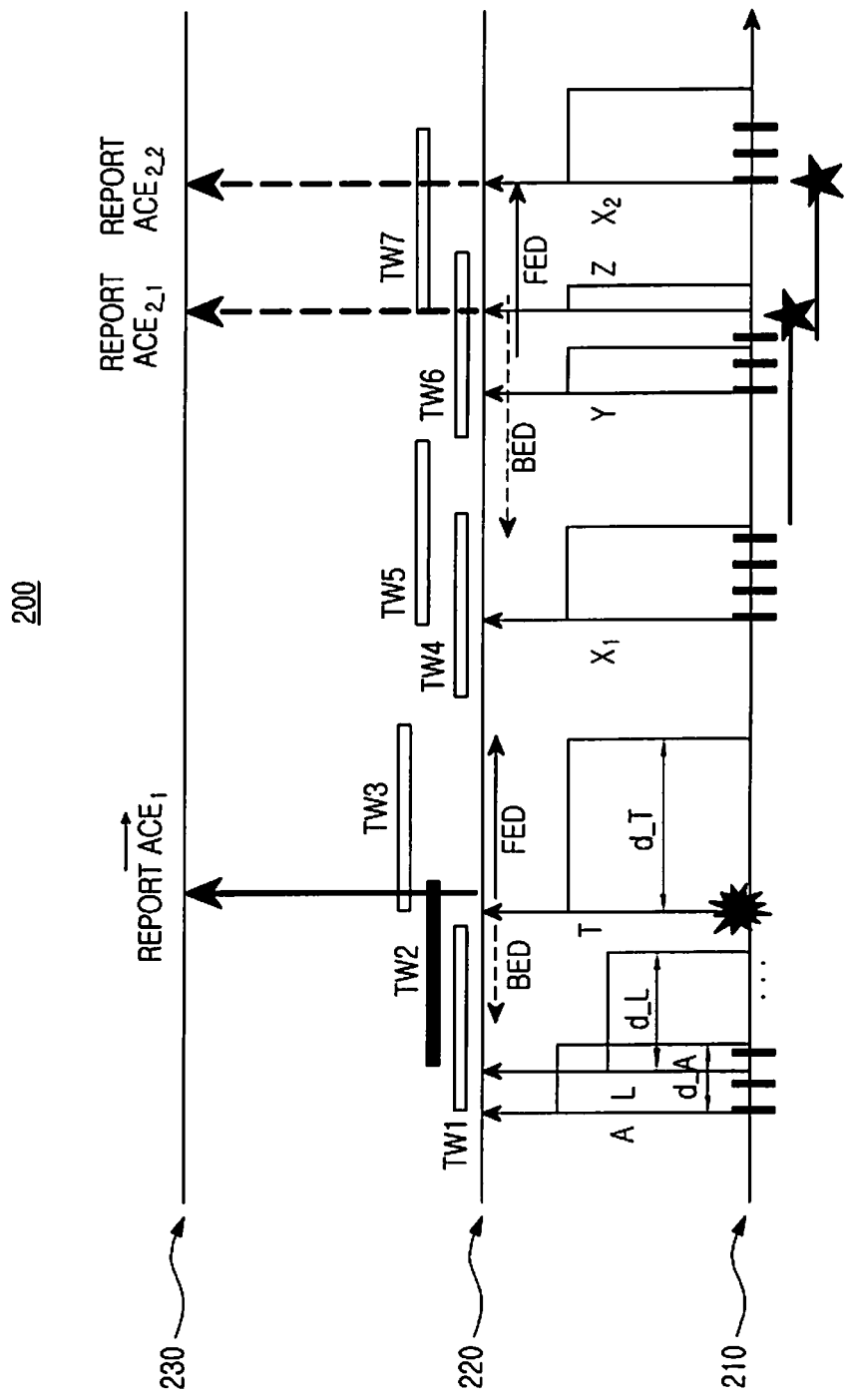
FIG. 3 is a diagram illustrating a method for detecting events in a sensor network according to a second embodiment of the present invention.

FIG. 3 is a diagram illustrating an example of the hierarchical structure for an event detection system consisting of multiple lower and upper layers. Referring to FIG. 3, the event detection system may include sensor nodes 210 consisting of multiple sensors, first coordinator nodes 220 (in an upper layer of the sensor nodes 210) for detecting events, and second coordinator nodes 230 in an upper layer of the first coordinator nodes 220.

Each of the sensor nodes 210 may be defined as the bottom-layer node consisting of at least one sensor for detecting primitive events. It is assumed that multiple primitive events A, L, T, X, Y and Z are detected in the respective sensor nodes 210. Also, it is assumed that A and L are included in a first time window TW1, T is included in a second time window TW2, X is included in a fourth time window TW4, and Y and Z are included in a sixth time window TW6.

In addition, it is assumed that the primitive events A, L and T constitute a first atomic complex event $ACE_1$ and the primitive events X, Y and Z constitute a second atomic complex event $ACE_2$ in another form.

Among the primitive events constituting the first atomic complex event $ACE_1$, T is included in the second time window TW2, and primitive events A and L are not. Therefore, the first coordinator nodes 220 may determine that the first atomic complex event $ACE_1$ has not been detected. However, if duration of the first atomic complex event $ACE_1$ is applied, the primitive event T is detected in this duration, so the first coordinator nodes 220 may recognize that the first atomic complex event $ACE_1$ has been detected, and report the detection to the second coordinator nodes 230 in their upper layer. Possible errors occurring in time window detection can be resolved.

Also, it is assumed that the order of occurrences of subordinate events constituting the first atomic complex event $ACE_1$ is important and their detection order is A→L→T. In addition, assuming that another time window is detected after the occurrence of A and L, and that T exists in a time window subjected to detection, if the time taken to detect A to T includes the duration of the first atomic complex event $ACE_1$, the detection of the first atomic complex event $ACE_1$ may be reported to the second coordinator nodes 230.

As to the second atomic complex event $ACE_2$, a situation corresponding to an event consumption mode should be considered, in which if the order of occurrences is not considered, it is determined whether to use the event occurrence once or several times. Member events Y and Z are used twice with a member event $X_1$ that occurred first and a member event $X_2$ that occurred later, so detection of the same complex event may be reported twice. However, the problem with the event consumption mode is due to discrete representation of the event occurrences by sensor's sampling. Therefore, the problem does not occur in the event duration-based detection used in the present invention. The two reports on the second atomic complex event $ACE_2$ correspond not to the problem, but to the reasonable results closer to the actual event occurrence.

The primitive events detected in the respective sensor nodes 210 are stored in separate storage media according to the time window, and superordinate events subjected to detection may be detected by extracting a time window including subordinate events based on a duration history given by the stored time window. Thus, a method for detecting a history may include a step of Backward Event Detection (BED)- detecting a time window preceding a particular time window in which a particular primitive event is included, or a step of Forward Event Detection (FED)-detecting a time window following the particular time window.

Eventually, as to the detection of a multiple complex event consisting of at least one atomic complex event or multiple primitive events, it is preferable to determine whether to perform detection using the history in which duration of atomic complex events and primitive events included in different time windows is stored. That is, in the present invention, a BED method may be used for memories of sensor nodes that detect complex events detectable together with other events by storing the events detected in the time window immediately preceding the current time window. Therefore, the aforesaid method of the present invention can resolve even the problem due to the method of detecting events only with the time window and the processing time and direction.

The time window in the present invention moves to the last event report or event occurrence time, and if no new event occurs during the time window after the movement of the time window, the time where the current time window ends may be defined as the time where the next time window starts.

The event detection method according to the present invention has no need to report all subordinate events that have occurred in the sensor node side to the upper node side, by recording the duration of the events subjected to detection and reporting only the occurrence/non-occurrence of the subordinate events (constituting superordinate events) included in the duration and the superordinate events subjected to detection.

Instead, the present invention reports the start and finish times of the subordinate events and stores the occurrence/non-occurrence of the superordinate events by comparing overlapping times among the subordinate events. Therefore, the event detection method according to the present invention increases the comparing of subordinate events in the stored history compared to the conventional event detection method, but can minimize message communication compared with the conventional method of reporting all events.

The occurrence history of subordinate events is reported to the coordinator nodes in the upper layer in the form of a start time $t(e_{i\_s})$ and a finish time $t(e_{i\_f})$.

Figure 4:
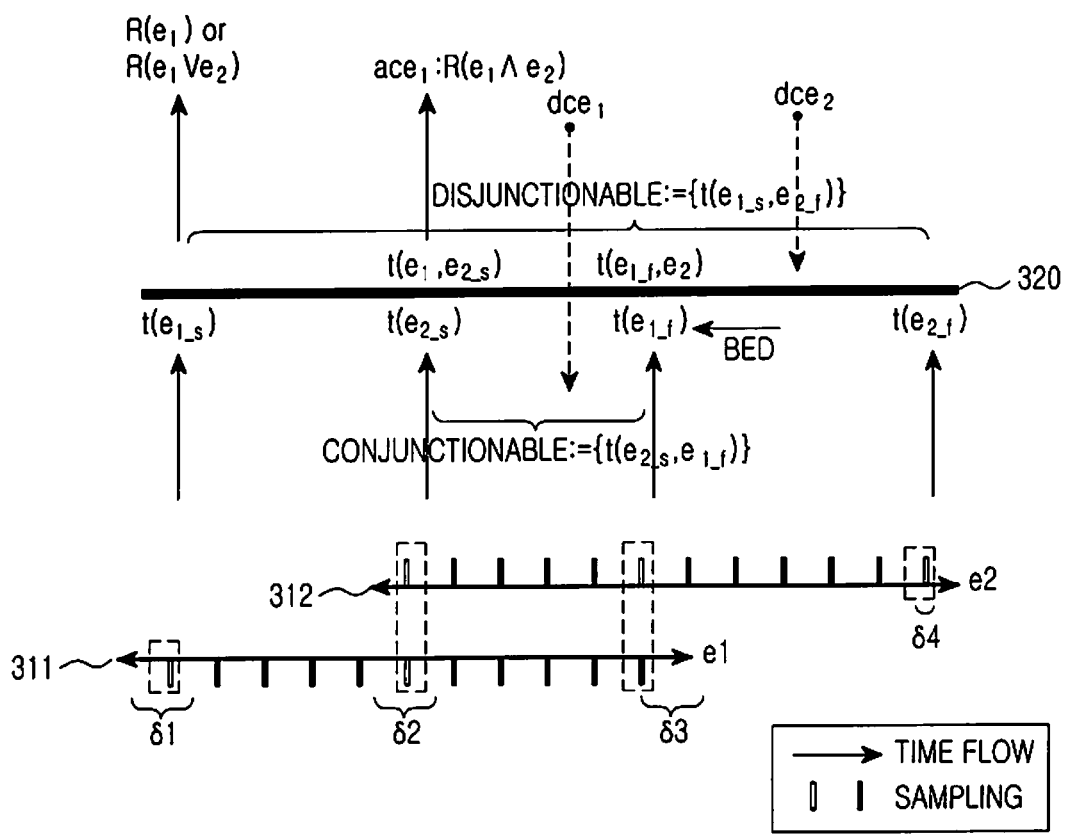
FIG. 4 is a diagram illustrating a method for detecting events in a sensor network according to a third embodiment of the present invention.

FIG. 4 illustrates another example of the event detection, in which 23 condition comparisons for event detection and 4 condition comparisons for overlapping/non-overlapping, a start time, a finish time, etc. may be performed. In the event detection of FIG. 4, a maximum of 4 message generations may happen, but a minimum of 23 message communications occurs when reporting all occurred events (sensor samples) according to the prior art. Comparing the example of FIG. 4 with the conventional event detection, the present invention can eliminate at least 19 message communications. For the events $e_1$ and $e_2$ shown in FIG. 4, occurrence/non-occurrence of the events may be determined by sampling for their associated durations 311 and 312, and if the events $e_1$ and $e_2$ are detected, the detection is reported to sensor nodes 320 in the upper layer.

δ1, δ2, δ3 and δ4 in FIG. 4 are examples based on sampling rates in four different places. However, the event detection of the present invention based on the reduced energy and the duration using the start and end of events is less affected by energy consumption despite the increase in the sampling rate, thereby contributing to a reduction in a rate of the intrinsic error occurring due to the expression by discrete sampling for continuous events in the real life.

FIG. 5 is a diagram illustrating an event detection method according to an embodiment of the present invention. Referring to FIG. 5, in the event detection method of the sensor network according to the present invention, the coordinator node positioned between the bottom-layer sensor nodes and the client stores and manages superordinate event's duration using the following history.

To manage a start and a finish of event duration, the coordinator node may manage a projected time history as follows:

(a) if a report on an event start time or finish time is transmitted to a coordinator node, the coordinator node searches and compares events to determine whether there is an event that has already started;

(b) if there is an event that has been started and a relation between two member events is in conjunction, the coordinator node manages duration overlapping from a start time of the later occurred event to a finish time of the earlier finished event, maintaining history information called "Conjunctionable"; and (c) a relation between two overlapping member events is disjunction and duration having a start time of the first occurred event and a finish time of the later finished event is managed as history information called "Disjunctionable."

History information of IDs i and j of two member events is as follows:

$$\text{Conjunctionable}[i,j] = \{st, ft\}$$

where i indicates a first occurred event among the events $e_i$ and $e_j$, and st and ft indicate overlapping durations between two member events, and $$\text{Disjunctionable}[i,j] = \{st, ft\}$$

where i indicates a first occurred event among events $e_i$ and $e_j$, st denotes a start time of the event $e_i$, and ft denotes a finish time of the event $e_j$.

The present invention provides "Valid Composition Projection" based on the event history, using a greater number of storages and computations. To this end, an algorithm using Conjunctionable and Disjunctionable shown in FIG. 5 is used in the coordinator node as a procedure for storing and finding the event history. The event history detected by this algorithm is shared and reused. A storage "PTH[2,N]" used in the algorithm stands for the Projected Time Histories, where N denotes the number of member events of one MCE. "PTH[0, i]" and "PTH[1,i]" denote a start time and a finish time of a member event $e_i$, respectively. PTH is initialized to zero (0). A detection report includes an event ID, and an event start time or finish time, and "tw" means a time set as a time window.

Figure 6:
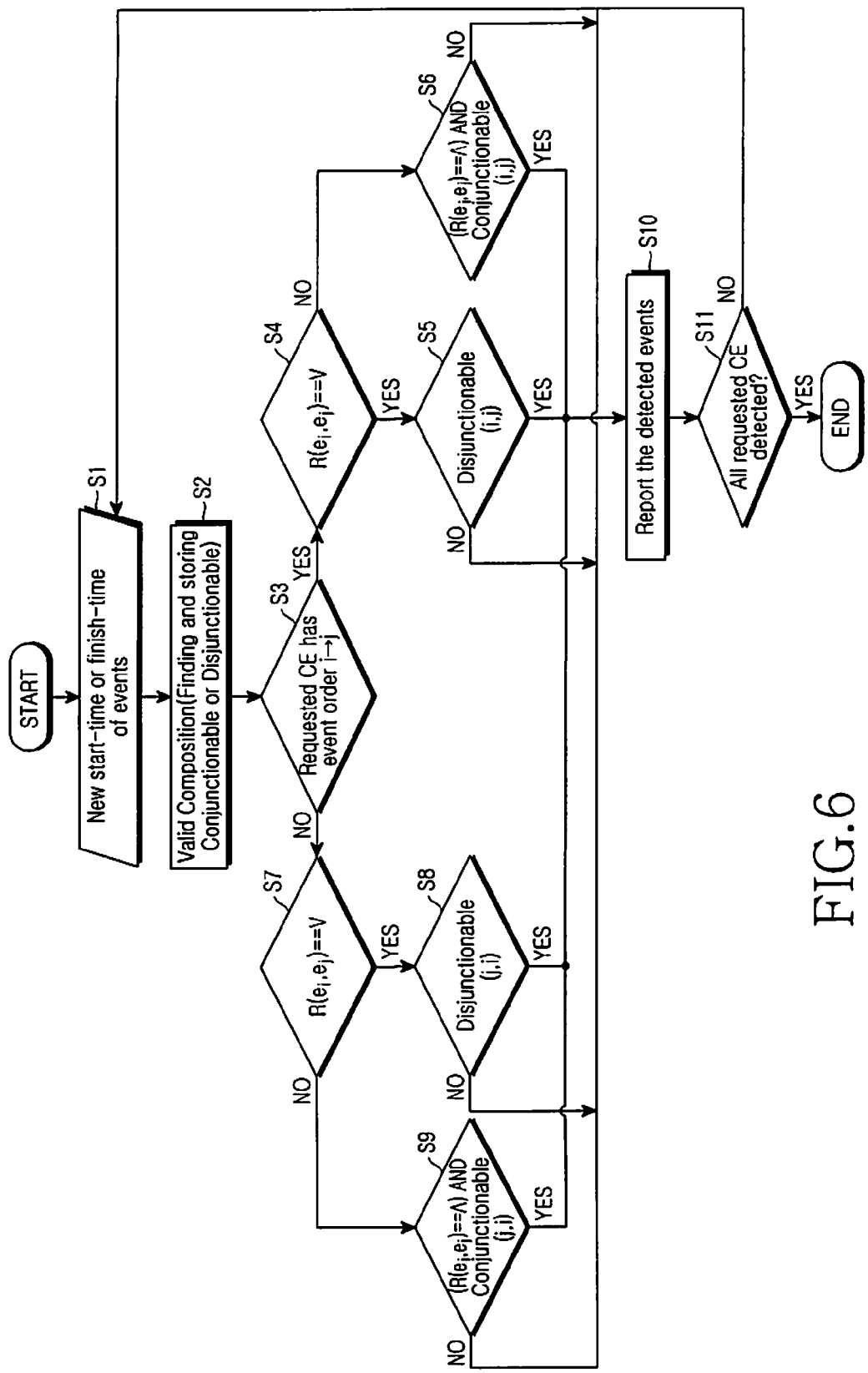
FIG. 6 is a flowchart illustrating a method for detecting events based on the algorithm in FIG. 5 according to a fourth embodiment of the present invention.

FIG. 6 is a flowchart illustrating a method for detecting events by a coordinator node or a sensor node in a sensor network according to a fourth embodiment of the present invention. Referring to FIG. 6, the event detection method includes the following steps. In step (a) or S1, the start or finish time of an event is received from a sensor node or sensor. In step (b) or S2, Valid Composition Projection for finding and storing Conjunctionable or Disjunctionable for the received event is performed using the algorithm shown in FIG. 5. In step (c) or S3, it is determined whether an occurrence order of events $e_i$ and $e_j$ being $e_i \rightarrow e_j$ is required in a requested or desired CE. In step (d) or S4, it is determined whether the events $e_i$ and $e_j$ having a disjunction relation are required in the requested CE, if the occurrence order of events $e_i$ and $e_j$ being $e_i \rightarrow e_j$ is required in step (c) or S3. In step (e) or S5, it is determined whether Disjunctionable[i,j] is already prepared according to step (b) or S2, if the events $e_i$ and $e_j$ having the disjunction relation are required in step (d) or S4. In step (f) or S6, it is determined whether the events $e_i$ and $e_j$ having a conjunction relation are required in the requested CE and Conjunctionable[i,j] is already prepared according to step (b) or S2 if the events $e_i$ and $e_j$ having the disjunction relation are not required in step (d) or S4. In step (g) or S7, it is determined whether the events $e_i$ and $e_j$ having the disjunction relation are required in the requested CE if the occurrence order of events $e_i$ and $e_j$ being $e_j \rightarrow e_i$ is required in step (c) or S3. In step (h) or S8, it is determined whether Disjunctionable [j,i] is already prepared according to step (b) or S2 if the events $e_i$ and $e_j$ having the disjunction relation are required in step (g) or S7. In step (i) or S9, it is determined whether the events $e_i$ and $e_j$ having the conjunction relation are required in the requested CE and Conjunctionable[j,i] is already prepared according to step (b) or S2 if the events $e_i$ and $e_j$ having the disjunction relation are not required in step (g) or S7. In step (j) or S10, the events $e_i$ and $e_j$ detected in step (b) or S2 are reported to an upper node side in case of YES in step S5, S6, S8 or S9. Step (a) or S1 is repeated in case of NO in step S5, S6, S8 or S9. Then, in step (k) or S11, it is determined whether all requested CEs are detected. Step (a) or S1 is repeated in case of NO in step S11.

According to another embodiment of the present invention, if the requested CE doesn't require any specific occurrence order of events $e_i$ and $e_j$ and the events $e_i$ and $e_j$ have the disjunction relation, then it may be determined whether Disjunctionable[i,j] or Disjunctionable[j,i] is already prepared according to step (b) or S2. Also, if the requested CE doesn't require any specific occurrence order of events $e_i$ and $e_j$ and the events $e_i$ and $e_j$ have the conjunction relation, then it may be determined whether Conjunctionable[i,j] or Conjunctionable[j,i] is already prepared according to step (b) or S2. Then, the events $e_i$ and $e_j$ detected in step (b) or S2 may be reported to the upper node side if Disjunctionable[i,j], Disjunctionable [j,i], Conjunctionable[i,j] or Conjunctionable[j,i] is already prepared according to step (b) or S2.

As is apparent from the foregoing description, the event detection method according to the present invention minimizes message transmission required for reporting all events, thereby reducing energy consumption due to unnecessary message transmission. In addition, the present invention can detect a variety of events by detecting stored event history and using event duration.

Therefore, the inventive event detection method may detect even high-level realistic events that can be hardly detected by only the hardware sensors.

In addition, the inventive event detection method may be utilized even for the general-purpose probing system by application of one MCE.

It is clear that the various methods, apparatuses, networks for detecting multiple events according to the present invention may be implemented by hardware, software (i.e. a program), or a combination of both. Such a program may be stored in a volatile or nonvolatile recording medium, which can be read by a machine, such as a computer. The recording medium includes a storage device, such as a ROM and the like, memory, such as a RAM, a memory chip, an integrated circuit, and the like, and an optical or magnetic recording medium, such as a CD, a DVD, a magnetic disk, a magnetic tape, and the like. That is, the method for detecting multiple events according to the present invention may be implemented in the form of a program, which includes code for achieving the method. Further, such a program may be transferred electrically through a medium, just as a communication signal propagated by wire or wirelessly, the equivalents of which are also included in the scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sensor network comprising:
   sensor nodes including multiple sensors for detecting primitive events; and
   a coordinator node for determining whether a first primitive event is detected in a current time window,
   wherein, if the first primitive event is detected in the current time window, determining whether a second primitive event exists in a previous time window, and
   wherein, if the second primitive event exists in the previous time window, determining whether the first and second primitive events are included in a duration of a complex event, and determining that the complex event has occurred if the first and second primitive events are included in the duration of the complex event.

2. The sensor network of claim 1, further comprising an upper-layer coordinator node for determining an occurrence or a non-occurrence of a complex event including at least one complex event, at least one primitive event, or a combination thereof, and reporting the determination to a client.

3. The sensor network of claim 2, wherein each of the sensor nodes comprises:
   a memory for storing primitive events detected in the sensors; and
   a transmitter for reporting to the upper-layer coordinator node the primitive events stored in the memory.

4. The sensor network of claim 3, wherein the coordinator node comprises:
   a memory for storing a primitive event reported from the sensor nodes;
   a controller for determining whether another primitive event constituting the complex event is stored in the memory in addition to the reported primitive events, and if said another primitive event is detected, generating a report signal for reporting the detection; and
   a transceiver for receiving a message for reporting the primitive event transmitted from the transmitter, providing the received message to the memory, and transmitting the report signal generated in the controller to the upper-layer coordinator node.

5. The sensor network of claim 4, wherein the controller classifies the primitive events stored in the memory according to their time windows, and determines whether the primitive events are included in the duration of the complex event subjected to detection.

6. A method for detecting multiple events, the method comprising the steps of detecting a first subordinate event constituting a superordinate event in a current time window;
determining whether a second subordinate event constituting the superordinate event exists in a previous time window; and
if the second subordinate even exists in the previous time window, determining whether the first and second subordinate events exist in a duration of the superordinate event;
determining that the superordinate event has occurred and reporting the determination, if the first and second subordinate events exist within the duration of the superordinate event.

7. The method of claim 6, wherein the first and second subordinate events are primitive events detected in sensors located in a bottom layer of a sensor network.

8. The method of claim 7, wherein the superordinate event comprises at least one primitive event and at least one atomic complex event that includes multiple primitive events.

9. The method of claim 6, wherein the superordinate event comprises multiple complex events including multiple atomic complex events.

10. A method for detecting multiple events, the method comprising the steps of:
    determining whether a first primitive event detected in a sensor node in a bottom layer exists in a current time window;
    determining whether a subordinate event other than the first primitive event constituting a superordinate event exists in a previous time window;
    if the subordinate event exists in the previous time window, determining whether the first primitive event and the subordinate event exist in a duration of the superordinate event; and
    determining that the superordinate event has occurred and reporting the determination, if the first primitive event and the subordinate event exist within the duration of the superordinate event.

11. The method of claim 10, wherein the subordinate event is a second primitive event or a complex event.

12. The method of claim 10, wherein if the first primitive event and the subordinate event are determined to have a conjunction relation the duration of the superordinate event is stored using a start time of the subordinate event.

13. The method of claim 10, wherein if the first primitive event and the subordinate event are determined to have a disjunction relation, a duration of the superordinate event is stored using a start time of the first primitive event and a finish time of the subordinate event.

* * * * *